(12) United States Patent
Berger et al.

(10) Patent No.: US 7,556,098 B2
(45) Date of Patent: Jul. 7, 2009

(54) OIL RECOVERY METHOD EMPLOYING AMPHOTERIC SURFACTANTS

(76) Inventors: Paul Daniel Berger, 3014 Deer Creek Dr., Sugar Land, TX (US) 77478; Christie Huimin Berger, 3014 Deer Creek Dr., Sugar Land, TX (US) 77478

( * ) Notice: Subject to any disclaimer, the term of this patent is extended or adjusted under 35 U.S.C. 154(b) by 130 days.

(21) Appl. No.: 11/827,903

(22) Filed: Jul. 14, 2007

(65) Prior Publication Data
US 2008/0011475 A1      Jan. 17, 2008

(51) Int. Cl.
*E21B 43/22*     (2006.01)
(52) U.S. Cl. .............. 166/270.1; 166/263; 166/279; 166/300; 166/305.1
(58) Field of Classification Search .............. None
See application file for complete search history.

(56) References Cited

U.S. PATENT DOCUMENTS

| | | | |
|---|---|---|---|
| 3,219,114 A | 11/1965 | Oxford | |
| 3,349,032 A | 10/1967 | Krieg | |
| 3,939,911 A | 2/1976 | Maddox | |
| 4,008,768 A | 2/1977 | Birk | |
| 4,216,097 A * | 8/1980 | Stournas | 507/240 |
| 4,554,974 A * | 11/1985 | Kalpakci et al. | 166/270.1 |
| 6,022,834 A | 2/2000 | Hsu et al. | |
| 6,043,391 A | 3/2000 | Berger et al. | |

OTHER PUBLICATIONS

Xavier Domingo, Betaines, Amphoter Surfacts 2$^{nd}$ Ed vol. 59 Surfactant Science Series, 1996, p. 76-174, Marcel Dekker, Inc. New York.

* cited by examiner

*Primary Examiner*—Zakiya W. Bates

(57) ABSTRACT

An oil recovery method employing amphoteric surfactants with the steps of: a) Injecting into one or more injection wells an aqueous solution containing a mixture of amphoteric surfactants containing mixture of amphoteric surfactants having a hydrocarbyl chain length between 8 and 26 and certain degree of unsaturation, and b) recovering the oil from one or more producing wells. The aqueous injection fluid may also contain one or more of the following: a thickening agent, an alkali, a co-solvent.

12 Claims, No Drawings

OIL RECOVERY METHOD EMPLOYING AMPHOTERIC SURFACTANTS

CROSS REFERENCE TO RELATED APPLICATIONS

This application is based on provisional application Ser. No. 60/831,028, filed on Jul. 14, 2006.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of Enhanced Oil Recovery (EOR) and more specifically to an Oil Recovery Process employing mixtures of amphoteric surfactants. The amphoteric surfactants are betaines containing both saturated and unsaturated hydrophobic hydrocarbyl groups and are derived from naturally occurring oils and fatty acids rendering them green and biodegradable.

This invention also relates to the recovery of oil from subterranean oil reservoirs and more particularly to improved chemical flooding operations involving the use of certain mixtures of amphoteric surfactants that are suitable for use in brines containing relatively high concentrations of divalent metal ions and at high temperature ranges.

Crude oil is recovered from oil-bearing reservoirs generally by three processes designated primary, secondary and tertiary recovery. In primary recovery the oil is produced through a producing well by taking advantage of the pressure exerted on underground pools of oil by gas or water present with the oil. Approximately 20% of the original oil in place (OOIP) is recovered by this process. Once this pressure has been exhausted other means of recovering the remaining oil must be employed. In secondary recovery the well may be re-pressurized with gas or water injected through one or more injection wells to recover approximately an additional 20% of the OOIP. Other secondary recovery methods include acidizing and/or fracturing to create multiple channels through which the oil may flow. After secondary recovery means have been exhausted and fail to produce any additional oil, tertiary recovery can be employed to recover additional oil up to approximately 60% OOIP. Tertiary oil recovery processes include, but are not limited to, steam flooding, polymer flooding, microbiological flooding, and chemical flooding.

Chemical flooding includes the use of surfactants for lowering the interfacial tension (IFT) between the injection brine and the residual oil usually to an ultra-low value of below $1 \times 10^{-2}$ mN/m. Mobility control agents such as polymers are usually employed along with surfactants to adjust the mobility ratio between the oil and the injection brine. It has also been found that alkali, when included in the injection brine, can react with the acidic material present in the trapped oil to form surface-active salts that enhance the effectiveness of the injected surfactant. Alkali also is preferentially adsorbed onto the reservoir and therefore reduces the loss of surfactant and polymer through adsorption.

Alkaline-Surfactant-Polymer Flooding (ASP) has been the subject of numerous studies, papers and patents, for example U.S. Pat. No. 4,004,638 issued to Burdyn et al. in 1977 and U.S. Pat. No. 6,043,391 issued to Berger et al. in 2000. Several other tertiary chemical processes for enhanced oil recovery include Alkaline Surfactant (AS), Alkaline Polymer (AP), and Alkaline flooding. The alkali commonly used in these applications are inorganic alkali including, but are not limited to, sodium hydroxide, sodium carbonate, the combination of sodium hydroxide and sodium carbonate, and sodium silicates.

There are many examples of the prior art that discuss the use of different types of surfactants and/or surfactant formulations for EOR including amphoteric surfactants. As is known by those who are familiar with the art, amphoteric surfactants have the advantages of providing low IFT, tolerance to salt and di-valent cations and fair to low adsorption loss to the formation. U.S. Pat. No. 4,216,097 to Stournas, discloses a process for the recovery of oil from subterranean reservoirs employing an aqueous solution of an amphoteric surfactant. The amphoteric surfactant is used at a relatively low concentration within the range of 0.001 to 0.1 weight percent and is injected in a relatively large pore volume amount of at least 0.5 pore volume. U.S. Pat. No 4,554,974 to Kalpakei, et al. discloses a method for recovering petroleum using a surfactant slug comprising an aqueous solution containing about 0.001 to about 5% by weight of an amphoteric surfactant and an effective amount of high molecular weight homopolysaccharide gum thickener derived from the fungus strains of genus *Schlerotium*.

Although the prior art employ amphoteric surfactants as part of various formulations for the recovery of oil, we have unexpectedly found that the degree of unsaturation and the distribution of carbon chain lengths in the lipophilic base is of extreme importance to lower IFT for a wide range of different gravity oils and brines. Furthermore, relatively low pore volumes of the injection fluid including the mixture of the amphoteric surfactants is required for effective oil recovery. This present invention provides improved performance and economics over the prior art.

LIST OF FIGURES

None

BRIEF DESCRIPTION OF PREFERRED EMBODIMENTS OF THE INVENTION

The present invention provides a new and improved chemical flooding process for the recovery of oil from subterranean reservoirs that comprises injecting into one or more injection wells and recovering the oil from one or more production wells a composition containing:

a) a mixture of amphoteric surfactants each characterized by the formula:

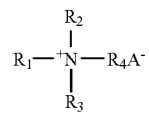

wherein:

$R_1$ is a hydrocarbyl group containing from 8 to 26 carbon atoms, the average of all hydrocarbyl groups having a ratio of Iodine Value (IV) to the Molecular Weight (MW) of the hydrocarbyl chain of at least 0.15 or $R_1$ is an alkyl amido group of the following structure

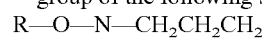

Where R=R$_1$

R$_2$ and R$_3$ are each independently a hydrocarbyl group containing from 1 to 8 carbon atoms or an alkoxy group containing from 2 to 10 carbon atoms and having a ratio of carbon atoms to oxygen atoms within the range of 2 to 3, R$_4$ is an aliphatic group containing from 1 to 6 carbon atoms, and A is a sulfonate group or a carboxylate group; and, b) optionally one or more alkali, c) optionally one or more thickening agents, d) optionally one or more co-solvents e) an aqueous solvent; and;

recovering the oil from one or more production wells.

The injection and production well may be the same well. The aqueous solution may contain other ingredients, known to the art, as needed. These include alkali to reduce adsorption, thickening agents to provide an effective mobility ratio, and co-solvent to improve in product handling, dissolution and compatibility. Alkali may be used at levels of 0 to about 2 wt %. Thickening agents may be used at concentrations from 0 to about 5 wt % and co-solvents may be used at concentrations of from 0 to about 10 wt % of the injection fluid.

In this disclosure amphoteric surfactants and betaines are used interchangeably to identify the structure previously described above.

A preferred application of the amphoteric surfactants of the present invention is their use with brines or brines containing relatively high concentrations of salt and divalent metal ions. They are effective over a wide range of electrolyte concentrations and they can be used over a wide range of concentrations and still give ultra-low IFTs. Furthermore, the mixture of amphoteric surfactants of the present invention are derived from fatty acids and naturally occurring animal, vegetable or marine oils that are biodegradable and green in nature.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention is an improvement over the prior art where amphoteric surfactants have been used to enhance the recovery of oil. The present invention involves a process for of recovery oil from a subterranean reservoir by injecting an aqueous liquid containing:

a) a mixture of amphoteric surfactants, each characterized by the formula:

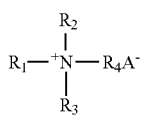

wherein:

R$_1$ is a hydrocarbyl group containing from 8 to 26 carbon atoms, the average of all hydrocarbyl groups having a ratio of Iodine Value to the Molecular Weight of the hydrocarbyl chain of at least 0.15 or R$_1$ is an alkyl amido group of the following structure R—O—N—CH$_2$CH$_2$CH$_2$ Where R=R$_1$ R$_2$ and R$_3$ are each independently a hydrocarbyl group containing from 1 to 8 carbon atoms or an alkoxy group containing from 2 to 10 carbon atoms and having a ratio of carbon atoms to oxygen atoms within the range of 2 to 3, R$_4$ is an aliphatic group containing from 1 to 6 carbon atoms, and A is a sulfonate group or a carboxylate group;

b) optionally one or more alkali, c) optionally one or more thickening agents, d) optionally one or more co-solvents e) an aqueous solvent; and;

recovering the oil from one or more production wells.

The groups R$_2$ and R$_3$ may be the same or different and are selected from the group consisting of C1-C0.8 hydrocarbyl groups or C2-C10 alkoxy groups having a ratio of carbon atoms to oxygen atoms within the range of 2 to 3. Stated otherwise, where R$_2$ or R$_3$ is an alkoxy group, it may be ethylene oxide, polyethylene oxide containing up to 5 ethylene oxide units, propylene oxide, polypropylene oxide containing up to 3 propylene oxide units, or oligimers of mixtures of ethylene oxide and propylene oxide containing no more than 10 carbon atoms. The nature of the R$_2$ and R$_3$ groups are, as noted previously, somewhat dependent upon the nature of the R$_1$ group or R group. Where R or R$_1$ comprises a relatively long chain aliphatic substitutent, R$_2$ and R$_3$ normally will be relatively short chain hydrocarbyl groups or ethylene oxide derivatives. For example, where R or R$_1$ is a C14-C0.18 aliphatic radical, R$_2$ and R$_3$ normally will be methyl or ethyl groups or groups comprising ethylene oxide, propylene oxide, or polyethylene oxides.

Non-exclusive examples of suitable alkalis are sodium hydroxide, sodium carbonate, sodium silicate, potassium hydroxide, potassium carbonate, or potassium silicate. Non-exclusive examples of thickening agents include polymers such as xanthan gum, polyacrylamide or viscoelastic surfactants such as betaines and amine oxides. Non exclusive examples of suitable co-solvents include low molecular weight alcohols, glycols, polyglycols, and glycolethers such as propylene glycol, ethylene glycol, diethylene glycol, isopropanol, butanol, iso-butanol, hexanol, 2-ethyl-hexanol, octanol, ethylene glycol monobutyl ether. The aqueous solvent may be water, an oilfield brine or a synthetic brine.

The amphoteric surfactant contains an inner quaternary ammonium group that is linked to a terminal sulfonate group or carboxylate group. The electrical charge on the inner quaternary group is electrically balanced by the terminal anionic group and such amphoteric surfactants may thus be characterized as dipolar ions or zwitter ions. The lipophilic base of the surfactant is linked to the terminal anionic group through the quaternary ammonium group and is provided by one or more hydrocarbyl groups.

The present invention has unexpectedly found the amount of unsaturation and the distribution of various carbon chain lengths of the lipophilic base within the amphoteric surfactants are very important for the performance of the amphoteric surfactants in the recovery of oil. The present invention also found that the optimum IFT and oil recovery, using relatively smaller pore volume than have been used in the past, may be obtained by using the proper mixture of the amphoteric surfactants with different amount of unsaturation and distribution of various carbon chain lengths of the lipophilic base within the amphoteric surfactants to improve the economics and the efficiency of the oil recovery process.

Non-exclusive examples of amphoteric surfactants which may be employed in carrying out the present invention include those having a lipophilic base derived from coconut oil, palm oil, palm kernel oil, tall oil, tallow, canola oil, rapeseed oil, herring oil, menhaden oil, soybean oil, corn oil, high erucyl acid rapeseed (HEAR) and other naturally occurring oils containing long chain fatty acids residues having a ratio of Iodine Value to the Molecular Weight of the hydrocarbyl chain of at least 0.15. Hydrogenated oils or those naturally containing a predominance of saturated lipophilic constituents have been found to perform poorly as components for recovering oil. Synthetic saturated and unsaturated derivatives having over 90% by weight of one component have also been found to perform less effectively than blends but can be used if two or more are blended to give the required MW and IV as will be described.

As is understood by those skilled in the art, surfactant molecules are characterized by an oil-soluble portion of the molecule that tends to partition into the oil phase of an oil-water interface and a water-soluble portion, that tends to partition into the water phase. In the amphoteric surfactants employed in the present invention, the sulfonate or carboxylate group is the water soluble portion. In addition, the ammonium quaternary group tends to impart water solubility to the surfactant molecule to a degree depending upon the characteristics of the substituents, $R_2$ and $R_3$, defined previously. The greatest water solubility is observed when the $R_2$ and $R_3$ are methyl or ethyl radicals or ethylene oxide derivatives. Propylene oxide derivatives and mixtures of ethylene oxide and propylene oxide derivatives van be used to obtain greater oil solubility or intermediate solubility.

The aliphatic group, $R_4$, defined previously, inking the quaternary ammonium and the sulfonate or carboxylate groups contains 1 to 6 carbon atoms and, in the case of $R_4$ containing 2 or more carbon atoms, may be saturated or unsaturated, and straight or branched chained. The $R_4$ radical may also be substituted with a group such as a hydroxy group, which tends to increase the water solubility of this portion of the surfactant molecule. Usually, however, the $R_4$ group will be unsubstituted hydrocarbyl radical. In a preferred embodiment of the invention, $R_4$ is an aliphatic group containing from 1 to 4 carbon atoms.

EXAMPLE 1

Analysis of various fatty acid and oils that we have used to synthesize the various betaines are shown in Table 1 in decreasing order of their Acid Value (AV). The AV is defined as the milligrams of potassium hydroxide necessary to neutralize the fatty acids in a 1 gram sample. The AV is a commonly accepted property used in the Fats, Oils and Surfactant Industries and can be determined using AOCS Official Method Te 1a-64 from the American Oil Chemists Society.

TABLE 1

Composition of various fatty acids and oils

| Acid or Oil | AV | <C12 | C12 | C14 | C16 | C16[1] | C18 | C18[1] | C18[2] | C18[3] | C20 | C20[1] | C20[2] | C22 | C22[1] | >C22 |
|---|---|---|---|---|---|---|---|---|---|---|---|---|---|---|---|---|
| C-1299[a] | 279 | 1 | 99 | 0.5 | | | | | | | | | | | | |
| C1216[a] | 263 | 1 | 61 | 25 | 11 | | 0.5 | 1.5 | | | | | | | | |
| Coconut Oil[b] | 255 | 13 | 47 | 19 | 9.5 | | 3 | 7 | 1.5 | | | | | | | |
| Palm Kernel Oil[b] | 250 | | 47 | 16 | 8.5 | | 2 | 17 | 3 | | | | | | | |
| C-1495[a] | 245 | | 2 | 97 | 1.5 | | | | | | | | | | | |
| Palmitic acid[g] | 219 | | | | 99% | | | | | | | | | | | |
| C-1214[a] | 209 | 1 | 70 | 27 | 2 | | | | | | | | | | | |
| Emersol ® 6321NF[c] | 201 | | | 3 | 5 | 6 | | 79 | 6 | 1 | | | | | | |
| Palm Oil[b] | 200 | | | 1 | 45 | | 3.8 | 40 | 10 | 0.2 | | | | | | |
| Canola Oil[d] | 200 | | | | 4.2 | | 1.9 | 58.8 | 21.2 | 10.2 | 0.6 | 1.7 | | 0.3 | 1 | 0.1 |
| Linoleic acid[g] | 200 | | | | | | | | 99.2 | | | | | | | |
| OL-600[a] | 199 | | | 0.3 | 5 | 0.3 | 2 | 61.3 | 20.4 | 6.2 | 2 | 2.5 | | | | |
| Oleic acid[g] | 197 | | | | | | | 99+ | | | | | | | | |
| C18-20[e] | 197 | 2 | | | 4.5 | | 2.4 | 23.4 | 30 | 19.5 | 1.5 | 13 | 1.3 | | 2.4 | |
| Stearic acid[g] | 197 | | | | | | 96 | | | | | | | | | |
| Tallow, BFT | 197 | | | 3 | 24 | 3.5 | 21 | 43 | 5 | 0.5 | | | | | | |
| Emersol ® 153NF[c] | 196 | | | | 4 | | 96 | | | | | | | | | |
| Soybean Oil[d] | 192 | 0.8 | 0.5 | 0.5 | 10 | | 4 | 22 | 54 | 8 | | 0.2 | | | | |
| Tall Oil fatty acid | 180 | | | | | | 2 | 59 | 37 | | 1 | 1 | | | | |
| HEAR Oil[e] | 176 | 1.1 | | | 2.1 | 0.1 | 1.1 | 11.4 | 14.7 | 8.8 | 0.9 | 6.7 | 0.8 | 1.4 | 46.6 | 4.3 |
| Hystrene ® 2290[f] | 165 | | | | | | | | | | 0.6 | | | 1.8 | 94.1 | 3.5 |
| Hystrene ® T-2802D[f] | 160 | | | | | | | 2.2 | | | 16 | | | 79 | | 1.3 |

[a]P&G Chemicals
[b]Huish Corporation
[c]Cognis Oleochemicals LLC
[d]Archer Daniels Midland
[e]VVF Ltd.
[f]Crompton
[g]Aldrich Chemical Table 2 shows the effect of the unsaturation of the fatty acids and fatty oils on IFT and oil recovery. The un-saturation of fatty acids and fatty oils is determined by the IV as described in AOCS Official Method Tg 1a-64, and is expressed in terms of the number of centigrams (cg) of Iodine adsorbed per gram of sample or the % Iodine absorbed. The ratio of the IV to the MW gives an indication of the amount of unsaturation in a particular molecule. The higher the ratio of IV/MW, the more unsaturation in the molecule. The linear correlation coefficient for the relationship between IFT and degree of unsaturation for 164 tests run using the betaines derived from oils and acids listed in Table 1 was found to be 0.896.

The betaines were made using a process that is one of many that are well known by those familiar with the art by quaternization of a fatty amine derived from one of the oils or acids with sodium chloroacetate. Betaines where the hydrocarbyl group is R—O—N—CH$_2$CH$_2$CH$_2$ are synthesized from the corresponding fatty acid or oil by reaction with an amine such as dimethylaminopropyl amine (DMAPA) to form an amido amine and quaternizing the amido amine with sodium chloroacetate. Preferred betaines formed from amido amines are fatty alkylamidopropyldimethyl betaines. Multiple samples were made using the same fatty acids and fatty oils. The IFT listed in Table 2 is the average of minimum 5 repeating samples.

The IFT in Table 2 was measured using 0.1% betaine in a West Texas brine solution containing 4,250 ppm total dissolved solids and 150 ppm of divalent cations using a University of Texas Model 500 Spinning Drop Tensiometer after 30 minutes of contact between the various betaines solutions and the crude oil. It is known to the familiar of the art that a low IFT is conducive to higher oil recovery and that an IFT of less than $1 \times 10^{-2}$ mN/m is preferred to recover any significant oil after primary and secondary methods have been exhausted. The data in Table 2 show that the higher the degree of unsaturation, the lower the IFT. In studies of over 160 different combinations of crude oils having API Gravities of 10 to 40, brines having Total Dissolved Solids (TDS) of >200 to over 200,000 mg/L and the betaines based on the acids and oils listed in Table I, We have found that a IV/MW value of 0.15 or more is required to give low to ultra-low IFTs.

The percent original oil in place (OOIP) recovered was measured by preparing identical sand packed columns for each test as is commonly employed in the industry. Each of the sand packs were saturated with 32% oil and the brine was pumped through the bottom of each of the sand packed columns until all the free oil was removed from the sand pack. 0.3-pore volume of each injection fluid composition was then pumped through the bottom of the separate sand pack columns to determine the residual oil removed by each composition. 0.15% Flopaam™ 3630S polymer is used along with the amphoteric surfactants for the oil recovery experiments.

TABLE 2

Relationship between IFT and Unsaturation at Constant MW
Crude oil: API gravity = 22
Temperature: 45° C.

| Fatty Acids or Fatty Oils Used For Betaine | MW | AV | IV | IV/MW | IFT | Oil Recovery, % OOIP |
|---|---|---|---|---|---|---|
| Stearic acid | 285 | 197 | 0.3 | 0.00 | 1.397 | 5.7 |
| Behenyl | 350 | 160 | 0.4 | 0.00 | 1.23 | 5.8 |
| Tallow, BFT | 285 | 197 | 48 | 0.17 | 0.0299 | 6.87 |
| Palm oil | 281 | 200 | 49 | 0.17 | 0.0153 | 7.01 |
| HEAR acid | 319 | 176 | 90 | 0.28 | 0.0367 | 10.6 |
| Oleic acid | 282 | 199 | 90 | 0.32 | 0.0056 | 12.6 |
| OL-600 | 282 | 199 | 115 | 0.41 | 0.0046 | 12.8 |
| Canola oil | 281 | 200 | 115 | 0.41 | 0.0035 | 14.54 |
| Soybean oil | 292 | 192 | 130 | 0.44 | 0.0018 | 14.8 |
| Tall Oil | 311 | 180 | 165 | 0.53 | 0.0009 | 15.43 |

EXAMPLE 2

Table 3 shows the IFT values obtained using two betaines made from fatty acids having very similar molecular weight (Oleic=282, Stearic=285) but where oleic acid contains unsaturated hydrocarbyl groups and the stearic acid is completely saturated. The IV, IV/MW and the IFT data of the mixture of the two samples at various ratios are shown in Table 3. These results again demonstrate that the mixture of amphoteric surfactants containing un-saturation is an important property for lowering IFT. The optimum un-saturation is also dependent on the brine and crude oil composition, the temperature and the formation properties. Note also that the highest IV/MW values do not necessarily give the lowest IFT.

TABLE 3

Effect Mixtures of Saturated and Unsaturated Betaines of Similar MW on IFT

| Oleyl Dimethyl betaine, wt % | Stearyl Dimethyl Betaine, wt % | IV | IV/MW | IFT, mN/m |
|---|---|---|---|---|
| 100 | 0 | 90 | 0.317 | 0.0056 |
| 90 | 10 | 81 | 0.286 | 0.0042 |
| 80 | 20 | 72 | 0.254 | 0.0019 |
| 70 | 30 | 63 | 0.222 | 0.0034 |
| 60 | 40 | 54 | 0.19 | 0.0017 |
| 50 | 50 | 45 | 0.159 | 0.0083 |
| 40 | 60 | 36 | 0.127 | 0.023 |
| 30 | 70 | 27 | 0.095 | 0.087 |
| 20 | 80 | 18 | 0.063 | 0.019 |
| 10 | 90 | 9 | 0.032 | 0.201 |
| 0 | 100 | 0.3 | 0.001 | 1.397 |

EXAMPLE 3

Table 4 show the effect of various concentrations of mixture of amphoteric surfactants made from fatty oils and fatty acids containing un-saturation on the IFT. The tests were run using brine containing 5 wt % sodium chloride as the aqueous solvent for the various concentrations of amphoteric surfactant. The data from Table 4 shows that the betaine mixtures made with unsaturated oleic acid and tallow BFT fatty acid provided low IFT over wide ranges of surfactant concentrations. This is important for oil recovery since the surfactant concentrations is continuously changing as the injection fluid propagates through the reservoir due to the adsorption and dilution. This is an improvement over the prior art such as Example S-2 from Table I of U.S. Pat. No. 4,216,097 that shows ultra-low IFTs below $1 \times 10^{-2}$ can only be obtained using concentrations of 0.00075 wt % or less. This may be a disadvantage since the adsorption may easily exhaust the low concentration of surfactants. U.S. Pat. No. 4,216,097 shows that extremely low concentrations of surfactant can give extremely low IFT values. A surfactant with a much wider range of useful concentrations giving ultra-low IFT is required to insure enough surfactant will reach the oil. Generally 0.02 to 5.0 wt % is used depending on the amount required to obtained the desired results.

TABLE 5

Effect Of Surfactant Concentration On IFT

| Surfactant Conc., wt % | Oleic Dimethyl Betaine | Tallow BFT Dimethyl Betaine |
|---|---|---|
| | IFT, mN/m | |
| 0.5 | 0.0178 | 0.0589 |
| 0.3 | 0.0067 | 0.0236 |
| 0.2 | 0.0031 | 0.0193 |
| 0.1 | 0.0012 | 0.0299 |
| 0.05 | 0.0011 | 0.0076 |
| 0.01 | 0.0007 | 0.0034 |
| 0.005 | 0.00028 | 0.0021 |

EXAMPLE 4

Table 5 shows the data obtained by measuring IFTs for various dimethylbetaines at 0.1 wt % in various salt solutions against the same crude oil. The data from Table 5 shows that the un-saturated betaines derived from oleyl and erucic acids are more effective in lowering IFT over a wider range of salt concentrations than their less unsaturated counterparts derived from tall oil fatty acid and behenic acid. Note that at higher salt concentrations the behenyl betaines becomes insoluble. This is another advantage of betaines having some degree of unsaturation in that they are soluble over a wider range of salt concentrations than their unsaturated counterparts.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

TABLE 5

Effect Of Salt Concentration On IFT

| NaCl, wt % | Oleyl Dimethyl Betaine | Stearic Dimethyl Betaine | Erucyl Dimethyl Betaine | Behenyl Dimethyl Betaine |
|---|---|---|---|---|
| | IFT, mN/m @ 65 C., 30 Minutes Reading | | | |
| 0.5 | 0.0252 | 0.0678 | 0.0032 | 0.8320 |
| 1.0 | 0.0199 | 0.0356 | 0.0046 | 0.8550 |
| 2.0 | 0.0122 | 0.0199 | 0.0060 | 0.8870 |
| 3.0 | 0.0099 | 0.0105 | 0.0090 | 0.9340 |
| 5.0 | 0.0012 | 0.076 | 0.0378 | Insoluble |
| 10.0 | 0.0037 | 0.0548 | 0.0567 | Insoluble |
| 15.0 | 0.0079 | 0.0234 | 0.0866 | Insoluble |
| 20.0 | 0.0095 | 0.0789 | 0.0999 | Insoluble |

What is claimed is:

1. A process for recovering oil from a subterranean reservoir by injecting an aqueous liquid containing a mixture of amphoteric surfactants, each characterized by the formula:

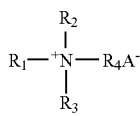

wherein:

$R_1$ is a hydrocarbyl group containing from 8 to 26 carbon atoms, the average of all hydrocarbyl groups having a ratio of Iodine Value to the Molecular Weight of the hydrocarbyl chain of at least 0.15 or $R_1$ is an alkyl amido group of the following structure R—O—N—$CH_2CH_2CH_2$ Where R=$R_1$ $R_2$ and $R_3$ are each independently a hydrocarbyl group containing from 1 to 8 carbon atoms or an alkoxy group containing from 2 to 10 carbon atoms and having a ratio of carbon atoms to oxygen atoms within the range of 2 to 3, $R_4$ is an aliphatic group containing from 1 to 6 carbon atoms, and A is a sulfonate group or a carboxylate group;

b) optionally one or more alkali, c) optionally one or more thickening agents, d) optionally one or more co-solvents e) an aqueous solvent; and;

recovering the oil from one or more production wells.

2. The process for recovering oil from subterranean reservoirs of claim 1 where the amphoteric surfactants are present in concentrations from about 0.02 wt % to 5.0 wt %.

3. The process for recovering oil from subterranean reservoirs of claim 1 where the one or more production wells may be the same as the one or more injection wells.

4. The process for recovering oil from subterranean reservoirs of claim 1 where the mixture of amphoteric surfactants contains a fatty alkyldimethyl betaine or a fatty alkylamidopropyldimethyl betaine.

5. The process for recovering oil from subterranean reservoirs of claim 1 where the mixture of amphoteric surfactants are derived from fatty acids and naturally occurring animal, vegetable or marine oils.

6. The process for recovering oil from subterranean reservoirs of claim 1 where the one or more alkali is chosen from the group sodium hydroxide, sodium carbonate, sodium silicate, potassium hydroxide, potassium carbonate, potassium silicate.

7. The process for recover oil from subterranean reservoirs of claim 1 where the one or more thickening agents are chosen from the group polymers, viscoelastic surfactants.

8. The process for recovering oil from subterranean reservoirs of claim 1 where the one or more co-solvents is chosen from the group low molecular weight alcohol, glycol, a polyglycol, glycol ether.

9. The process for recovering oil from subterranean reservoirs of claim 1 where the aqueous solvent is chosen from the group water, an oilfield brine, a synthetic brine.

10. The process for recovering oil from subterranean reservoirs of claim 1 where the one or more alkalis are used at concentrations of from 0 to about 2 wt %.

11. The process for recovering oil from subterranean reservoirs of claim 1 where the co-solvent is used at concentrations of from 0 to about 10 wt %.

12. The process for recovering oil from subterranean reservoirs of claim 1 where the one or more thickening agents are used at concentrations from 0 to about 5 wt %.

* * * * *